Patented Oct. 26, 1937

2,096,771

UNITED STATES PATENT OFFICE 2,096,771

POLYCHLORORETENES AND METHOD OF PREPARING THEM

Eric Wahlforss, Cleveland, Ohio, Leo A. Goldblatt, Erie, Pa., and George Lacy, Cleveland, Ohio, assignors to The Glidden Company, Cleveland, Ohio, a corporation of Ohio No Drawing. Application October 24, 1934, Serial No. 749,814

8 Claims. (Cl. 260—161)

This invention relates to the chemistry of retene, and has particular reference to a new group of retene derivatives, namely, the polychlor retenes.

Retene (1-methyl-7-isopropyl-phenanthrene) is a hydrocarbon found in pine tar and other pine products in various quantities, depending on the method of treatment. It is structurally related to abietic acid, a constituent of rosin; this appears to be a derivative of a hydrogenated retene. The preparation of retene from rosin has been successfully carried out; but the reverse synthesis has never been accomplished.

Although retene is available in commercial quantities, little work has been done with it, and very few derivatives have been prepared. This is probably due to the relative stability of the hydrocarbon, as most of the common aromatic reactions (nitration, sulfonation, side chain oxidation, Friedel-Crafts reaction) are peculiarly difficult and complicated when applied to retene. It is believed that the presence of the methyl and isopropyl groups exerts a steric hindrance.

Most of the investigators who have worked with retene have been interested in determining its exact structure, and the relation of retene to rosin and abietic acid. As a result of this feature, the investigators have been primarily interested in getting certain compounds, and primary attention has not been paid to commercial feasibility, cost of raw materials and high yields. The chlor derivatives, because they present no clues to the structure, have not been prepared, with the exception of monochlororetene, which is a rather pale yellow, viscous oil, which boils at 215° C. at 4 mm. pressure.

We have discovered that the polychlor retenes may be prepared in relatively good yield by proper control of chlorination conditions, and that technical products of considerable usefulness may be obtained by proper purification of the reaction products of the chlorination. We have obtained a series of products, containing chlorine equivalent to the substitution of from two to six chlorine atoms. These products range from very viscous oils to solids possessing very definite resinous characteristics, capable of being powdered but thermoplastic at temperatures approaching high summer heat (90° F.). They possess very valuable technical properties, as insulating compositions, as resins in the coating industries, and as constituents of lubricants.

We have also found that proper purification of the crude reaction product can be obtained by taking it up in a selective solvent such as petroleum naphtha, which dissolves the chlorocompounds, but definitely rejects the asphaltic impurities present.

The following examples are typical of our invention.

Example 1

153 grams of retene oil, as obtained by the fractionation and processing of pine tar, and containing some hydrogenated retene, were placed in a tube with 0.5 gram iodine, and chlorine bubbled through for 20 hours, maintaining the retene in a molten condition at 160° F.; a gain in weight of 86 grams was obtained, corresponding theoretically to a dichlororetene. The crude product was dissolved in petroleum naphtha, filtered cold, washed with water, aqueous caustic soda and then water, and finally dried over anhydrous sodium sulphate. A dark brown, viscous oil was obtained upon the evaporation of the solvent.

Further work with direct chlorination of retene, at temperatures from 100° F. to 350° F., indicated that products of higher chlorine content than di- could not be obtained, due to excessive frothing, which prevented accurate work. Replacement of the iodine by iron powder, anhydrous $FeCl_3$, $AlCl_3$, aluminum powder, and iron shavings gave substantially the same results.

The retene oil used in this and some of the following examples in every case yields somewhat more insoluble asphaltic material than pure retene.

Example 2

24 pounds of retene oil and 42 pounds of carbon tetrachloride (approximately equal volumes) were placed in a jacketed iron chlorinator. Water was circulated through the jacket, maintaining the temperature at approximately 80° F. Chlorine was bubbled through for six hours, until 7½ pounds of chlorine (equivalent to monochlororetene) had been used. A 5 pound sample was withdrawn.

Chlorination was continued until a total of 14½ pounds of chlorine equivalent to the di- compound had been used. A 7 pound sample was then taken. The run was continued, taking five pound samples at intervals corresponding theoretically to the trichloro compound (21½ pounds chlorine) tetrachloro- (27½ pounds) pentachloro- (32½ pounds) and heptachloro (40 pounds). Chlorination was discontinued when 46 pounds of chlorine had been used; a residual charge of 35 pounds of material remained in the unit.

Example 3

The purification of the samples is exemplified by the following procedure, applied to the residue in the unit. 8 kilograms of the crude product was steam distilled from a 12 liter flask, until only a trace of solvent remained. The residue was characterized by its brittle, resinous properties on cooling. The whole mass was taken up in 13 pounds of petroleum naphtha boiling between 250 and 350° F., and filtered. A black asphaltic sludge remained behind. The naphtha solution was split into two fractions. One was steam distilled to remove naphtha; it was a dark brown, very brittle resin which ground up in a mortar to a light brown powder.

Example 4

The second naphtha solution of Example 3 was washed in a separatory funnel successively with water, 5% caustic soda solution, and water. The naphtha solution was steam distilled to remove solvent, and the residue powdered. It was neutral, and of a slightly better color than the product of Example 4. The products obtained in Example 2, purified as in Example 3, were tested for actual chlorine content, with the following results:

Sample #2 was a very viscous liquid containing 27.9% chlorine, corresponding to the dichlorocompound (23.4% Cl).

Sample #3 was a plastic, very sticky semisolid, with 31.3% chlorine, corresponding to trichlororetene (31.5% Cl).

Sample #4 was a soft dark red resin, with a ball and ring melting point of 118° F. It contained 37.1% chlorine, corresponding to tetrachlororetene (38.2% Cl); its specific gravity was about 1.40.

Samples #5 and #6 were intermediate in chlorine content.

Sample #7 contained 43.4% chlorine, corresponding to pentachlororetene (43.7% chlorine). It was a brown fairly hard resin with a ball and ring melting point of 132° F., and a specific gravity of approximately 1.43.

The products of Example 4 had a chlorine content of 49.4%, corresponding to hexachlororetene (48.3% Cl); the resin had a ball and ring melting point of 148° F., and a specific gravity of approximately 1.48.

Example 5

10 grams of pure retene were dissolved in 200 cc. of carbon tetrachloride, and 0.1 gram iodine was added. Chlorine was slowly bubbled through the solution over a period of nine hours, until 20 grams of chlorine were taken up. The product was purified by the method of Example 3, followed by a caustic wash as in Example 4. A product similar to the product of Example 4 was obtained, except that a somewhat paler color was obtained. A noteworthy feature of this chlorination, as compared with the chlorination of the retene oil, is that the residue on the filter, from the naphtha solution, was negligible in quantity as compared with that obtained in Example 3.

In general we have found that any solvent may be used for the retene which will not react with the chlorine under the reaction conditions. Carbon tetrachloride and trichlorobenzene are excellent solvents.

Iodine, anhydrous iron and aluminum chlorides, aluminum, and iron powders, and other catalysts favoring nuclear chlorination may be used. In general, a lighter color is obtained with catalysts other than with iron catalysts.

The concentration of retene used in the solvent may be varied within wide limits, depending on working conditions. We have found the use of equal volumes of retene and of carbon tetrachloride to be satisfactory. With higher concentrations, frothing is apt to occur, although with careful control this can be minimized. Lower concentrations of retene are of course uneconomical, since satisfactory control can be had in the higher concentrations.

While we have shown two different methods of purification in the examples, the extent of purification needed will vary with the purpose for which the technical chlorocompounds are to be used. In general, the steam distillation method gives technical products without further treatment, on the lower polychloro compounds; but with the higher compounds, occlusion of free hydrochloric acid seems to be more prevalent, and we prefer to use a caustic wash to insure absolute neutrality in the finished product.

Our technical polychlororetenes have very valuable properties in the extreme pressure lubrication field, as set forth in the co-pending application of Wahlforss, Johnson and Lacy. They form films when deposited from solvent, and may be used with other film-forming ingredients as resins and/or balsams, to improve the resistance to alkali and to fire. They may be used, in admixture or alone, as insulating compositions, their resistance to alkali and to fire, together with their electrical resistance, rendering them especially adaptable for this purpose.

While we refer to our new products as di, tri, tetra, penta and hexachlororetene, we do not believe these technical products to be pure compounds, but rather a mixture of closely related isomers, containing in the mass a chlorine content equivalent to the di, tri, etc. compounds, and acting technically as a uniform product.

The raw material retene, as the term is used in the process claims, includes pure retene, and mixtures such as retene oil containing a major portion of retene.

We claim:

1. Chlorinated retene, having a chlorine content indicating two substituted chlorine atoms, said chlorine being substituted in the nucleus, and being a very viscous amber oil.

2. The chlorinated retenes, having a chlorine content indicating from two to six substituted chlorine atoms, said chlorine being substituted in the nucleus, and ranging in physical characteristics from viscous oils to resinous solids.

3. Chlorinated retene, having a chlorine content indicating six substituted chlorine atoms, said chlorine being substituted in the nucleus, and being a resinous solid.

4. Chlorinated retene, having a chlorine content indicating four substituted chlorine atoms, said chlorine being substituted in the nucleus, and being a plastic solid.

5. The method of making technical polychlororetene which comprises chlorinating retene in a solvent, in the presence of a chlorination catalyst, removing the solvent, taking up the residue in petroleum naphtha, separating the insoluble matter, and separating the polychlororetene from the petroleum naphtha.

6. The method of making technical polychlororetene which comprises chlorinating retene in a solvent in the presence of a chlorination catalyst, distilling off the solvent with steam, taking up the residue in petroleum naphtha, filtering off the insoluble matter, and removing the naphtha by steam distillation.

7. The method of claim 5, in which the naphtha solution is washed with dilute alkali and water.

8. The method of claim 6, in which the naphtha solution is washed with dilute alkali and water.

ERIC WAHLFORSS.
LEO A. GOLDBLATT.
GEORGE LACY.